Feb. 8, 1966  R. E. REED ETAL  3,233,604
HEATING DEVICE

Filed March 4, 1963  2 Sheets-Sheet 1

Feb. 8, 1966    R. E. REED ETAL    3,233,604
HEATING DEVICE

Filed March 4, 1963    2 Sheets-Sheet 2

United States Patent Office 3,233,604
Patented Feb. 8, 1966

3,233,604
HEATING DEVICE
Raymond E. Reed, Box 226, Barrington, Ill., and Edward C. Ryan, 817 W. Gunnison, Chicago, Ill.
Filed Mar. 4, 1963, Ser. No. 262,708
9 Claims. (Cl. 126—263)

This is a continuation-in-part of application Serial No. 825,306, filed July 6, 1959, now Patent No. 3,079,911, application Serial No. 9,595, filed February 18, 1960, now Patent No. 3,101,707; and application Serial No. 20,610, filed April 7, 1960, now abandoned.

This invention relates to devices for heating substances, primarily foods, by the exothermic chemical reaction of a dry chemical mix with water applied thereto at the time of use. More particularly, the invention concerns improvements in such a heating device disclosed in our application Ser. No. 825,306, filed July 6, 1959 (now Patent No. 3,079,911, March 5, 1963), of which this application is a continuation-in-part, or in devices to be used in conjunction therewith, to facilitate the ease and efficiency of utilization thereof for effective heating at low cost.

In our aforesaid Patent No. 3,079,911, there is disclosed such a device in the form of a substantially rigid, cup-shaped container for the chemical composition having a laterally projecting rim to which is secured a facing to confine the dry, chemical composition in the container, this facing being of readily puncturable foil, or of a water-permeable material such as paper or non-woven fabric, which is sufficiently dense to prevent sifting out of the dry chemical during handling prior to use. This device may be effectively and easily utilized by applying the requisite water to the chemical through the facing, and then associating the device with the bottom of a receptacle containing the food or other substance to be heated, as by forcing the container rim into a groove, or setting it on a ledge, on the side wall of the receptacle spaced above its bottom edge.

In our said Patent No. 3,079,911, the preferred dry chemical mixes disclosed are those in which, the exothermic reaction in the presence of water is primarily due to changing the valence level of a powdered metal included in the mix, through electrolytic displacement of another ion. Such mixes are greatly preferable to other known types of dry chemicals capable of reacting exothermically in the presence of water in that they may be readily formulated at low cost, as for example, in accordance with the examples given in our said Patent No. 3,079,911, and also in our copending application Ser. No. 9,595, filed Feb. 18, 1960, now Patent No. 3,101,707 of which this application is also in part a continuation to provide heat above the boiling point of water to generate large volumes of steam, as is important for the effective utilization of the device for its intended purpose, without attendant disadvantages such as the great swelling of lime if used as the chemical. These preferred chemical mixes tend to be hydrophobic, rather than hydrophilic as is lime, thus being slowly absorbent of water, and this is a desirable property in that it enables the amount of water required to activate the entire body of chemical to be applied initially, the slow rate of penetration providing a slow, progressive reaction of the chemical layer from top to bottom as the applied water progresses therethrough. On the other hand, the slow water-absorption rate of the preferred chemicals presents certain problems which it is an object of this invention to solve.

We have found that when the portion of the facing sheet of the chemical container through which the activating water is applied is in contact with, or embedded in, the chemical, whether that facing be of water-absorbent material or of punctured, previously impervious material, the rate of passage of the water through the facing is extremely slow, with adverse consequences. One of these is that a substantial part of the water applied to the facing may run off rather than pass through the facing. As disclosed in our prior application Ser. No. 20,610, filed April 7, 1960, now abandoned, of which this application is also a continuation-in-part, this difficulty may be overcome by making the facing sufficiently concave to retain the water, this construction having the added advantage of enabling the user to employ the concave facing portion as a measure of the quantity of water to be applied.

But the slow rate of transfer of water through a facing in contact with the chemical has other important disadvantages. As the water enters the chemical the reaction starts in the area immediately below the zone of the facing to which the water has been applied. The steam thereby generated and the heated air and gases within the container have no ready means of escape. If the facing is of foil punctured in the zone to which the water has been applied, the apertures are covered by a body of water which acts as a seal. If the facing be of absorptive material, the pores thereof are filled with and sealed by the water, this being true in the areas beyond as well as within the zone to which the water has been applied, due to lateral absorption of the water in the material at a much more rapid rate than it will pass through it. The build-up of pressure of steam and hot-air and gases thus sealed in the container has the consequent dangers either of stopping the chemical reaction, which will not proceed under excessive pressure, or of causing explosion of the container. Furthermore, the facing tends to balloon upwardly under the pressure, so that any water remaining on the surface of the facing may be lost.

Our invention overcomes these difficulties and obtains a more complete and rapid wetting of the chemical by providing a container in which the facing through which the water is applied is out of contact with the chemical at least in the zone which receives the water, the spacing of the facing above the chemical being preferably at least approximately equal to the volume of water required to activate the chemical, which will be applied to the facing. In addition, there are preferably provided apertures in the facing beyond the zone which receives the water thereon, these apertures being water-free, or substantially so, and permitting the air within the container to be displaced therethrough by the water entering through the apertures in the application zone. As a consequence of this arrangement, the rate of passage of the water through the facing is made independent of the rate at which it can be absorbed by the chemical, and is much more rapid, so that the water is only momentarily held on the facing and then is forced rapidly through it by the hydrostatic pressure of the water pool on the facing. Under the influence of gravity, the water entering the container spreads over the surface of the chemical, so that even though water is applied only to a localized zone of the facing, it is supplied to a much greater area of the surface of the chemical. A substantially better and more uniform distribution of water in the chemical is thereby obtained, since the chemical layer absorbs water laterally with great difficulty, very slowly and with considerable irregularity.

The chemical container facing is, at least in a mid-portion, disposed below the edge of the cup-shaped container body to which it is attached, which has sufficient rigidity to sustain its shape and to hold the facing so disposed. There is thus provided a concavity in the upper face of the container, this concavity being preferably of sufficient volume to contain all the water required for initial activation of the chemical. This concavity may be provided in an interior portion only of the facing, or the entire facing may be concave with respect to the edge of the remainder of the container body. In the latter case, the concavity is preferably of greater volume than required to hold the water to be initially applied, in order to provide marginal areas of the facing to which water is not applied.

Where the facing is of impervious foil it is punched in the zone to which the water is applied to form openings through which the water may enter the container, and it is also punched in areas beyond said zone to provide one or more apertures which are not water-clogged and which will permit free displacement therethrough of air within the container by the entering water, and also will subsequently permit free escape of steam, air and other gases in the container as the chemical is activated. These openings may be pre-punched and sealed with an adhesive covering sheet or may be punched by the user. Where the facing is of porous material such as paper or fabric it is preferably treated to render it resistant to lateral wetting, so that areas beyond the zone underlying the applied water remain water-free and open, to permit the free escape of air, steam and other gases from the container. In addition, or in the alternative, such a facing may be treated to provide localized areas which are structurally relatively weak compared to other areas, and which will readily rupture under excessive pressure within the container, if escape of steam and gases therefrom is not sufficient to prevent excessive pressure build-up in the container.

In the effective utilization of our chemical heating units, it is important that the steam emanating therefrom be forced to flow over substantially the entire area of the outer surface of the food receptacle which, on its inner surface, is in engagement with the substance to be heated. In this way, this area of the receptacle is directly heated by the steam, initially, at least, by condensation thereon. Another object of this invention is to provide means of inexpensive construction (as is most important to the commercial utility of the devices concerned) by which steam emanating from the chemical heating receptacle is directed into contact with this area of the outer surface of the receptacle (which may be far more extensive than the surface area of the chemical container through which the steam is emitted), before uncondensed steam is vented to atmosphere, as is necessary to keep the heating devices functioning properly, at substantially atmospheric pressure.

The foregoing, and other objects and advantages of the invention will be more fully apparent from the following particular description, in conjunction with the appended drawings, showing preferred embodiments of the invention.

Figure 1:
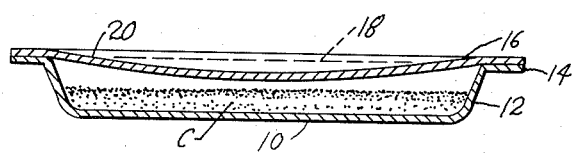
FIG. 1 is a vertical cross-sectional view of a container of chemical heating composition according to this invention.

Referring now to the embodiments illustrated in the drawings, the chemical container shown in FIG. 1 has a bottom wall 10 and an upstanding side wall 12, which has a laterally projecting rim 14, the walls 10 and 12 being formed of metal, preferably of aluminum, or of plastic or other impervious material, which is of sufficient rigidity to maintain its shape under conditions of handling and use, and which is also not meltable or substantially softened by heat at temperatures developed in the container when the chemical is activated. Walls 10 and 12 form a shallow dish or cup within which is contained the layer of chemical C. A facing 16 covers and encloses the chemical C within the container formed by walls 10 and 12, the facing 16 being joined to the upper edge of the wall 12, preferably by heat-sealing or otherwise adhesively bonding the facing 16 to the upper edge of wall 12 and also to the rim 14.

It will be noted by reference to FIG. 1 that the facing 16 is, throughout its extent, spaced above the chemical C. It will also be noted that substantially the entire facing 16 is concave, that is, it lies below the upper edge of wall 12, actually more so at its mid-portion than elsewhere. The concavity thus provided in the upper face of the container preferably has a volume in excess of the volume of liquid needed to be applied to activate the chemical, so that the pool of water on the facing rises to a level below the top edge of the wall 12 of the container, as indicated by the dotted line 18 in FIG. 1. This leaves areas 20 beyond the line 18 which are not covered by the water applied to the central area of the facing 16.

In the areas 20, one or more apertures are preferably provided for the escape of air as water passes through the more central portion of the facing 16. These apertures may be punched, if the facing 16 be an impervious material such as aluminum foil, either by the user or by the manufacturer, along with apertures through the more central portion which receives the water. If the facing 16 be of porous material, such as paper or woven or non-woven fabric, it is preferably of such a nature as to be highly resistant to lateral wetting, so that areas 20 may remain relatively dry to permit the free escape of air, steam and other gases from within the container. Papers and fabrics treated with silicone resins, for example, have such lateral wetting resistance to a substantial degree. The facing may be treated in entirety with resins, waxes, metallic soaps or other agents for preventing lateral absorption of water by the facing, or it may be treated only in localized zones or lines surrounding the area of the facing to which the water is applied. In either event, the pores of the material in the areas 20 will remain open and substantially unclogged by water, so that air may be displaced therethrough to permit rapid entry of water through the more central portions of the facing 16, and also to facilitate the subsequent escape from the container of steam and gases consequent on the chemical reaction.

In this embodiment it will be appreciated that the user should not over-fill the concavity of the facing 16 with water, and to avoid this, a fill guide line may be provided between the areas 20 and the interior of the facing 16.

Figure 2:
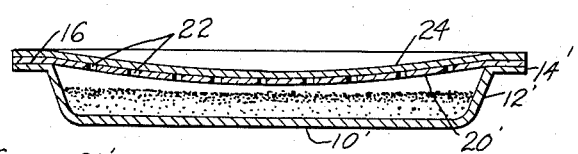
FIGS. 2–5 are vertical cross-sectional views of respectively different modifications of the embodiment of FIG. 1.
Figure 3:
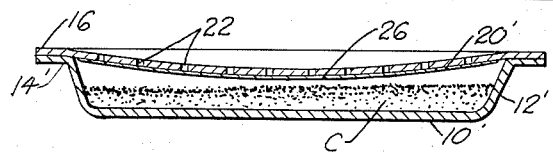

The embodiments of FIGS. 2 and 3 are the same as that of FIG. 1, except that the facing of the chemical container is of pre-punched foil, and means are shown for sealing the punctured foil against atmospheric moisture, which might prematurely start the chemical reaction. In these figures, in which the same parts as in FIG. 1 are designated by primes of the same reference numerals, the pre-punched apertures are indicated at 22. The sealing means in the embodiment of FIG. 2 is a sheet 24 of moisture-impervious material overlying the facing 16 and adhesively bonded to the edges thereof beyond the openings 22; the adhesive bonding being such as to prevent access of moisture to the interior of the chemical container through openings 22, and also such as to enable sheet 24 to be readily stripped from facing 16 when it is desired to use the chemical container. In the embodiment of FIG. 3, the substantially air-impervious sealing layer 26 is adhered to the under surface of the facing 16 and is freely water-soluble, so as to permit prompt passage through the openings 22 of water applied to the upper surface of facing 16'. The material of the layer or film 26 should be of such chemical composition as will not interfere in any way with the chemical reaction, since it becomes dissolved in the activating water.

Figure 4:
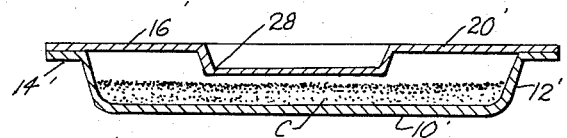

In the embodiment of FIG. 4, the walls 10' and 12' are again the same as in the embodiment of FIG. 1. The facing 16' is, however, indented only centrally at 28 to form a central concavity of sufficient volume to contain the amount of water required to properly activate the chemical composition C. In this embodiment, as in the case of FIG. 1, the facing 16' may be of impervious material such as aluminum foil, or it may be of water-pervious material, such as paper or fabric. If the facing 16' is impervious, apertures will be provided or punched therein in the area of the concavity 28 to permit the water to pass therethrough and there will also preferably be provided, in the facing 16' beyond the confines of the depressed portion 28, one or more apertures to relieve pressure build-up within the container. In this embodiment, as in that of FIG. 1, if the facing be of porous paper or fabric, the facing will preferably be in whole or in part treated to inhibit lateral absorption of the water in the areas of the facing beyond the depressed portion 28.

Figure 5:
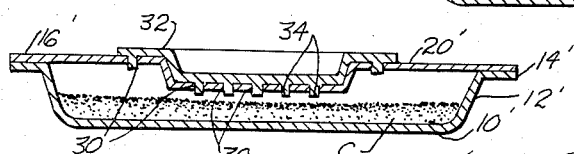

The embodiment of FIG. 5 is similar to that of FIG. 4 but has the facing 16' of the chemical container of impervious material pre-formed with apertures 30, the device being sealed against ingress of atmospheric moisture by a facing plug 32 of polyethylene or other similar inexpensive material, having prongs 34 extending through the pre-formed apertures 30 to provide the seal. In use, the plug 32 is simply stripped from the device, which is then ready for use as above described.

In all of the embodiments previously described, the water supplied to the facing will pass therethrough with great rapidity, at least if adequate vent through the facing is provided in the areas 20 or 20' beyond the zone in which the water is contained. The water passing through the facing 16 or 16' spreads laterally under gravitational action over the surface of the chemical mix C, so that a substantially uniform and complete wetting of the chemical is obtained, as previously described. Steam and gases resulting from the chemical reaction can readily escape through the apertures in the facing beyond the zone of liquid application.

Figure 6:
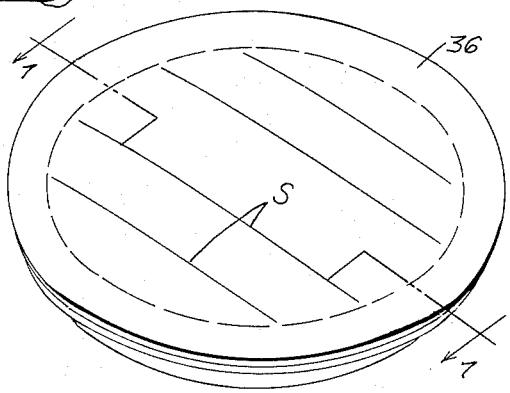
FIG. 6 is a plan view of still another modification of the embodiment of FIG. 1.
Figure 7:
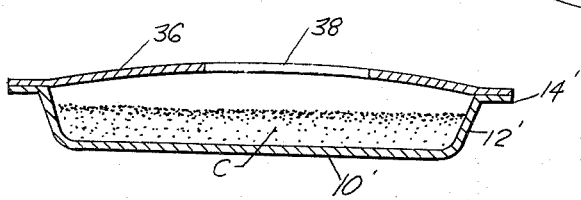
FIG. 7 is a vertical cross-sectional view on lines 7—7 of the embodiment of FIG. 6 after activating water has been applied thereto.

FIGS. 6 and 7 show a chemical container similar to that shown in FIG. 1, having a facing 36 of porous material such as paper or non-woven fabric, the material being sufficiently dense to prevent the fine powdery chemical from sifting through it. Such materials when wet form a substantially impervious barrier to the escape of steam, air and other gases from the container. To insure against excessive pressure build-up within the container, the facing 36 is provided with weakened areas formed by scored lines S. As the pressure starts to build up within the container, the facing will balloon upwardly, as indicated in FIG. 7, placing the material under lateral tension so that the material tears or separates along one or more of the scored lines, as indicated at 38 in FIG. 7; forming a vent or vents to relieve the pressure.

Figure 8:
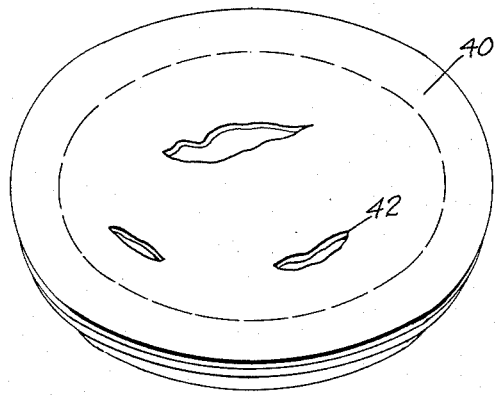
FIG. 8 is a plan view of a modification of the embodiment of FIG. 6, after activating water has been applied thereto.

The weakened areas in the facing may be provided in other ways than by scoring. For example, such areas may be alternatively provided by selecting a paper having the requisite density and dry strength to prevent sifting but which is inherently of low wet strength, and omitting the usual wet strength treatment in spaced areas thereof or even entirely. FIG. 8 shows an embodiment of the invention wherein such a paper is employed to form the facing 40 of the chemical container which is otherwise the same as the embodiment of FIGS. 6 and 7. After activating liquid has been applied to the facing 40 it is caused by the ballooning force of the vapor pressure building up within the container to rupture or tear in those areas of lowest wet strength, as indicated by the irregular tear lines 42 in FIG. 8.

For purposes of an embodiment such as FIG. 8, we have found that, in order to function properly, the low wet strength in the burst areas is desirably below a wet-burst strength of about 25, and preferably below 20, determined as the maximum height in inches of a two inch diameter column of distilled water which a wet two inch diameter test area of the paper will support without bursting. Such papers should, of course, have sufficient dry strength to withstand rupture under normal handling and sufficient density to prevent sifting out of the chemical. Examples of commercially available papers which satisfy these specifications and which we have found suitable for use in the FIG. 8 embodiment are a paper designated "Whatman 41," made by W. & R. Balstrom, Ltd. of Maidstone, Kent, England, and a paper designated as "No. 7" made by Eaton-Dikeman Co. of Mt. Holly Springs, Pennsylvania. These papers have a wet strength by the above test in the range about 12 to 15, a dry strength by the Mullen test in the range about 7 to 16, and a porosity as determined by the Gurley densimeter in the range about 10 to 20.

Where the porous facing material is treated so that it is highly resistant to lateral wetting beyond the zone to which water is applied, release of pressure within the container may take place adequately through the unwetted areas of the facing, so that the provision of weakened, rupturable areas in the facing will not be necessary. However, even with such treatment of the facing, it may be desirable also to provide means for excess pressure relief, such as illustrated in FIGS. 6–8.

Figure 9:
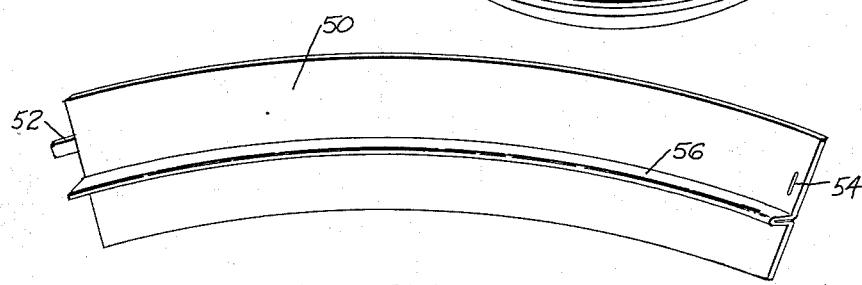
FIG. 9 is a perspective view of a device for forming a receptacle for associating a pan of food with a chemical heating device according to the invention.
Figure 10:
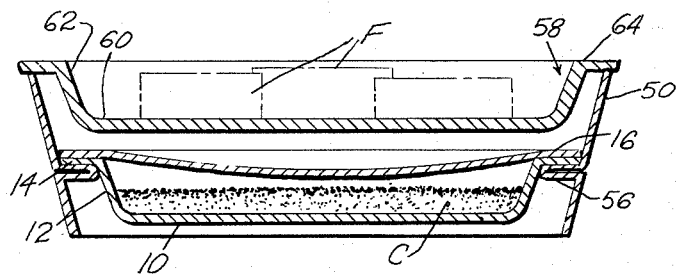
FIG. 10 is a vertical cross-sectional view of the device of FIG. 9 formed into a receptacle, with the pan of food and chemical container applied thereto.
Figure 11:
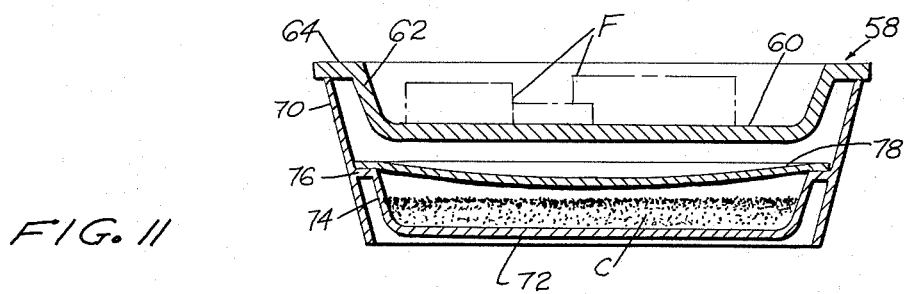
FIG. 11 is a vertical cross-sectional view of a modification of the device shown in FIG. 10, wherein the receptacle and chemical container are integral.

FIGS. 9–11 illustrate means by which the chemical containers of the invention may be readily, inexpensively and efficiently utilized to heat a pan of food. In FIG. 9, such means is illustrated as a blank 50 of cardboard or other low heat-conductive, readily bendable and inexpensive material, adapted to be bent or curled into tubular form, as shown in FIG. 10, and retained therein, as by the insertion of tab 52 at one end of the blank in slot 54 at its other end. Preferably, as shown, the blank 50 is provided intermediate its long sides, with an inwardly projecting rib 56, which may be formed as shown by suitably folding the material of the blank. The length of the blank is correlated to the diameter of the chemical container and food pan, so that when the blank is curled and fastened in tubular form as shown in FIG. 10, a chemical container such as illustrated in FIG. 1, may be inserted through the open upper end thereof until the rim 14 thereof seats upon the rib 56 of lesser inner diameter, which serves to support the chemical container within the receptacle formed by blank 50 and above the bottom edge thereof.

The pan 58 of food F has a bottom wall 60 and upstanding side wall 62 of lesser diameter than the upper end of the receptacle formed by blank 50, and a laterally projecting rim 64 of greater diameter than said end so as to seat thereon, with the body of the food pan suspended within the receptacle, spaced above the facing 16 of the chemical container. Activating water will be applied to the facing 16 of the chemical container before the food pan is applied to the receptacle. Thus, as the chemical reaction proceeds, steam flows through the facing 16 into the chamber formed between the facing 16 and the walls and rim of the food pan. The food pan is preferably of highly heat conductive material such as aluminum, so that it absorbs heat from the steam and hot gases contacting its outer face and conducts the heat to the food contacting its inner face to a much greater extent than the relatively low heat-conductive material of the receptacle formed by blank 50 will absorb and radiate heat.

The engagement between the under side of rim 64 and the upper edge of blank 50 will ordinarily be irregular, providing sufficient vent openings to prevent excessive pressure build-up in the chamber between the food pan and the chemical container. However, if desired, one or more vent openings may be provided in blank 50 above rib 56. Also, if it is desired to expose the food directly to the steam resulting from the chemical reaction, one or more openings may be provided in the food pan wall 62, so that steam may flow therethrough into the pan where it will normally be confined by a cover on the pan (not shown).

It will be appreciated that the receptacle formed by blank 50 need not be of such shape as to form a frusto-conical tubular receptacle as shown. The receptacle formed thereby may be of equal diameter at top or bottom and it may also be of any shape, such as square or rectangular, to suit that of the food pan which is to be heated. If the receptacle be of diminishing diameter from top to bottom, rib 56 may be dispensed with, wedging of the rim 14 of the chemical against a portion of the receptacle wall of lesser diameter being relied upon for its support.

In the embodiment of FIG. 11, the tubular receptacle 70, corresponding to that formed out of the blank 50 of FIGS. 9 and 10, is pre-formed or molded in its tubular form of suitable, relatively non-conducting material, such as polystyrene or other plastic, and includes, integral therewith, the bottom wall 72, side wall 74 and rim 76 of the chemical container, said walls and rim corresponding respectively to the walls and rim of the chemical container of any of the preceding figures, bottom wall 72 being located above the bottom edge of the side wall of receptacle 70. In this embodiment, the chemical is inserted in the cup-shaped container formed by bottom wall 72 and side wall 74, and a suitable facing 78, which may conform to that of any of the preceding figures, is adhesively united at its edges to rim 76 to retain the chemical.

The utilization of the device of FIG. 11 to heat a pan 58 of food F is the same as explained in connection with that of FIG. 10 and, as noted in connection with that embodiment, vent openings may be provided in the wall of receptacle 70 above the chemical container, and openings may also be provided in wall 62 of the food pan to permit steam to enter therein.

As stated previously in this application, the preferred dry chemical mixes which are used, and designated as C in all the figures, are those in which the exothermic reaction is due primarily to changing the valence level of a metal through electrolytic displacement of the ion of another metal. Such compositions will normally include, in powdered form, the metal, the replaceable compound which provides the ion to be displaced, an oxidizing agent, and a substantially inert filler, with or without an adsorbent for inhibiting the emission of undesired gases. Desirably the filler is of a substance which, under the conditions of the reaction, tends to cake and thus to form the reacted chemicals into a more or less solid layer which can not readily escape from the container, even through tear openings formed in the facing. A suitable composition of this type is as follows:

| | Percent |
|---|---|
| $CaSO_4 \cdot \tfrac{1}{2} H_2O$ (filler) | 45.3 |
| $KClO_3$ (oxidizing agent) | 17.0 |
| Al (metal) | 34.0 |
| $CuSO_4 \cdot 1 H_2O$ (replaceable compound) | 1.3 |
| Activated charcoal (adsorbent) | 2.4 |

It will be understood that we have described only preferred embodiments of our invention and that changes may be made therein without departing from the spirit and scope of our invention.

We claim:

1. A device for heating food comprising a container having a bottom and substantially rigid surrounding sidewall of impervious material and containing therein a dry mixture of chemicals capable, in the presence of water, of reacting exothermically and of generating substantial volumes of steam, a facing covering the top of said container and secured to the side wall thereof, at least an interior portion of said facing being located below the upper edge of said container side wall to provide a concavity to receive water applied thereto for activating said chemicals, said facing in the area of said concavity being porous or puncturable to permit flow therethrough of said water, said facing being spaced above said chemicals at least in the area below said concavity.

2. A device as claimed in claim 1 wherein the space between said facing and said chemicals has a volume at least substantially equal to the volume of water required to activate the chemical.

3. A device as claimed in claim 1 wherein said facing is of impervious, readily puncturable material.

4. A device as claimed in claim 1 wherein marginal portions of said facing above the level of liquid applied to said concavity are porous or puncturable to permit escape of gases within the container.

5. A device as claimed in claim 4 wherein said facing is of a porous material resistant to lateral absorption of water at least in said marginal portions.

6. A device as claimed in claim 1 wherein said facing is of impervious material provided with apertures therethrough, and said apertures are sealed by a substantially air-impervious material adhesively secured to said facing.

7. A device as claimed in claim 1 wherein said chemicals react exothermically in the presence of water by changing the valence level of a metal due to electrolytic displacement of another ion.

8. A device as claimed in claim 1 wherein said facing is of water-pervious material and is provided with relatively weak areas in which the material is adapted to pull apart under lateral tension developed by predetermined pressure within the container to form openings therethrough to relieve such pressure.

9. A device as claimed in claim 8 wherein said weakened areas in said facing are formed by scoring.

References Cited by the Examiner

UNITED STATES PATENTS

| | | | |
|---|---|---|---|
| 2,018,367 | 10/1935 | Lackenbach | 126—263 X |
| 2,040,407 | 5/1936 | Reed | 126—263 X |
| 2,126,734 | 8/1938 | Chancey | 126—263 X |
| 2,384,720 | 9/1945 | Babcock et al. | 126—263 |
| 2,533,958 | 12/1950 | Root et al. | 126—263 X |
| 2,541,736 | 2/1951 | Alexander | 126—263 |
| 2,553,878 | 5/1951 | Steven | 126—263 |
| 2,613,664 | 10/1952 | Rivoche | 126—263 |
| 2,693,793 | 11/1954 | Steven | 126—263 |
| 2,733,709 | 2/1956 | Sukacev | 126—262 |
| 2,823,665 | 2/1958 | Steinbach | 126—263 |
| 2,997,165 | 8/1961 | Leuthy et al. | 206—47 |
| 3,079,911 | 3/1963 | Ryan et al. | 126—263 |

FREDERICK L. MATTESON, Jr., *Primary Examiner.*

JAMES W. WESTHAVER, *Examiner.*